J. KLEIN.
Smut Machine.
No. 3,196.
Patented July 26, 1843.
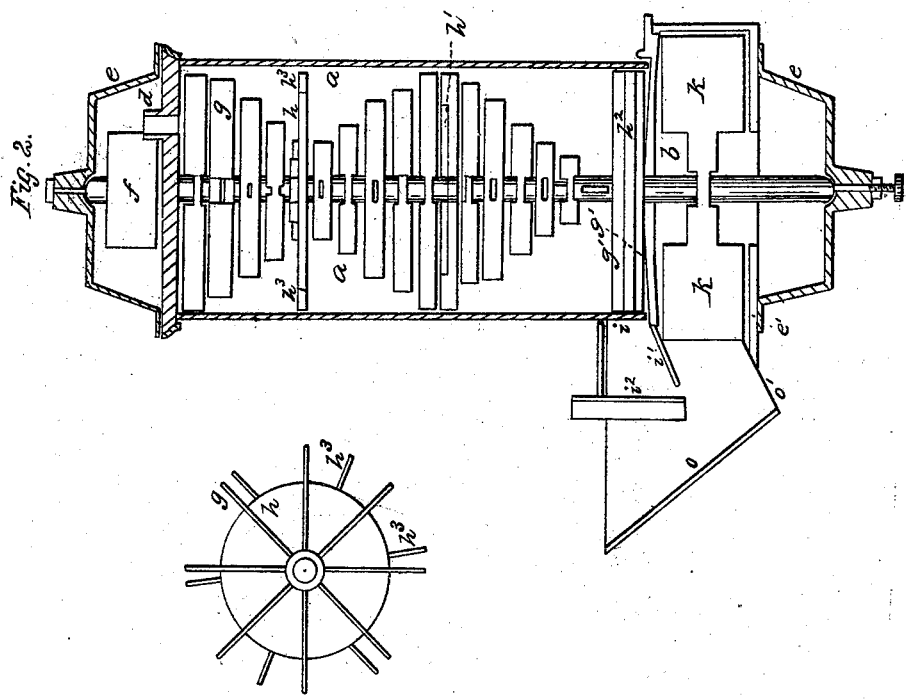
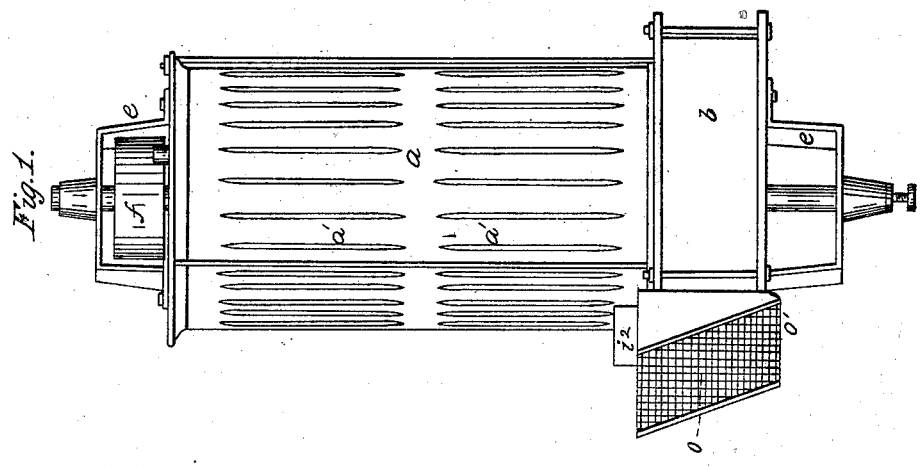

UNITED STATES PATENT OFFICE.

JOSEPH KLEIN, OF LOW HILL, PENNSYLVANIA.

CONSTRUCTION OF SMUT-MACHINES.

Specification of Letters Patent No. 3,196, dated July 26, 1843.

*To all whom it may concern:*

Be it known that I, JOSEPH KLEIN, of Low Hill, in the county of Lehigh and State of Pennsylvania, have invented a new and Improved Smut-Machine; and I do hereby declare that the following is a full, clear, and exact description thereof, reference being had to the annexed drawings, which form a part of this specification, in which—

Figure 1, is a geometrical elevation. Fig. 2, a vertical section of the case showing the runner in place.

The nature of my invention consists in the formation and arrangement of the beaters on the runner so as to clear the grain from smut in the most effectual way, the smut being driven by said beaters out of the case, which has oblong slits in it for that purpose, and cleaning the grain after leaving the machine.

The case is a hollow cylinder ($a$) formed of staves, having a head above and below, which are secured together by rods and screws which reach from one to the other. The under head projects all around, beyond the staves ($a$) and below it there is a larger cylinder ($b$), short, and affording sufficient space for a fan in its interior; in the side of this case there is an aperture ($c$) from which projects a tangent spout in which there is a screw put across the spout at an angle of about 45° by which the dust may be carried off as required; the head ($c'$) below this last named cylinder, has a large hole in its center, the head between the lower or fan part ($b$), and the upper cylinder ($a$) is slightly conical, and has a hole at its center, just large enough for the shaft of the runner to pass through, and the upper head is fixed in the same way, with the addition of a small spout ($d$), near its periphery, to carry the grain in before it is cleaned. To the upper and lower heads, there are brackets ($e$) affixed, to support the ends of the runner shaft, steps being made therein for that purpose. Between the upper bracket and the head of the case there is a pulley ($f$) on the shaft of the runner, by which it is driven;— below the upper head inside the cylinder are four narrow vanes or arms ($g$) extending across from one side to the other, and attached to the shaft by their middle; these are placed spirally around; below them there is a flat disk ($h$), somewhat smaller than the inside of the case, and having six, more or less beaters project from its rim to the full circumference of the inside of the case; below this again are four more beaters, similar to those first described, when another disk ($h'$) like that marked ($h$) is put on; five more beaters are then added, and below all, there is a disk ($h^2$) nearly the size of the case; on the under side of this, ribs $s'$ project from it radially from the center, to the outer circumference; and on its upper side similar ribs are formed.

A hole ($i$) is made in the case, opposite the last named disk, and directly over that in the cylinder ($b$) below, and in each of the staves there are two series of parallel slits ($a'$) cut quite through them, and extending nearly half their length; one series being above the other; the edges of each of these slits ($a'$) are chamfered off on the outside.

In the lower chamber there are vanes ($k$) for the purpose of giving air to the grain as it comes out of the machine at the hole ($i$). The grain enters the machine through the spout ($d$), passes down through the beaters, and is thrown out by the lower disk through the hole ($i$) in the side, and is received onto an inclined board ($i'$) projecting from the hole ($i$) toward the screen ($o$) upon which the grain falls from it; in front of said inclined board ($i'$) there is a vertical slide ($i^2$) for regulating the feed from the beaters—the grain passes down the screen ($o$) and the dust and other foreign substances are there blown out from it, and the clean grain falls out below over the edge of the screen at ($o'$) into a receiver and the dust is either sifted through the screen or is blown out over the top.

What I claim as my invention and desire to secure by Letters Patent is—

The combination of the screen ($o$) inclined board ($i'$) and slide ($i^2$) with the fan and beaters in the manner and for the uses above set forth.

JOSEPH KLEIN.

Witnesses:
JOHN HITZ,
DAVID WEIDA.